United States Patent
Cocchini et al.

(10) Patent No.: US 10,939,189 B1
(45) Date of Patent: Mar. 2, 2021

(54) OBSTRUCTION DETECTING SLEEVE FOR CONDUIT STRUCTURES

(71) Applicant: INTERNATIONAL BUSINESS MACHINES CORPORATION, Armonk, NY (US)

(72) Inventors: Matteo Cocchini, Long island City, NY (US); Kyle Indukummar Giesen, Lagrangeville, NY (US); Zachary Thomas Dreiss, Beacon, NY (US); Kyle Wonderly, Beacon, NY (US); Juan Martinez-Mantilla, Fishkill, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/572,697

(22) Filed: Sep. 17, 2019

(51) Int. Cl.
H04Q 9/00 (2006.01)
H04W 84/12 (2009.01)

(52) U.S. Cl.
CPC .......... *H04Q 9/00* (2013.01); *H04Q 2209/30* (2013.01); *H04Q 2209/826* (2013.01);
(Continued)

(58) Field of Classification Search
CPC .......... H04Q 2209/00; H04Q 2209/10; H04Q 2209/30; H04Q 2209/40; H04Q 2209/826;
(Continued)

(56) References Cited

U.S. PATENT DOCUMENTS

| 10,590,640 B2* | 3/2020 | Pearce, III | E03C 1/1222 |
| 2007/0063856 A1* | 3/2007 | Gibson | F22B 37/50 |
| | | | 340/608 |

(Continued)

FOREIGN PATENT DOCUMENTS

| CN | 104197205 B | 5/2016 |
| CN | 106090627 A | 11/2016 |
| JP | 6091986 B2 | 11/2014 |

OTHER PUBLICATIONS

Detectit, "Alarm systems by Detectit", www.detectit.com/our-products/, 2019, pp. 1-2.
(Continued)

*Primary Examiner* — Franklin D Balseca
(74) *Attorney, Agent, or Firm* — Tihon Poltavets

(57) ABSTRACT

An apparatus for detecting an obstruction in a conduit structure, the apparatus includes a sleeve portion, a plurality of sensor cells, a primary termination cap, and a secondary termination cap. The plurality of sensor cells coupled to the sleeve portion, wherein each sensor cell from the plurality of sensor cells is electrically coupled to the primary termination cap and the secondary termination cap. The sleeve portion configured to wrap around a conduit structure, wherein each sensor cell from the plurality of sensor cells is directed to an exterior surface of the conduit structure. The primary termination cap electrically and mechanically coupled to a first end of the sleeve portion, wherein the primary termination cap includes Wi-Fi transmitter, a primary microcontroller, and a power source connection. The secondary termination cap electrically and mechanically coupled to a second end of the sleeve portion to short the plurality of sensor cells.

19 Claims, 7 Drawing Sheets

(52) U.S. Cl.
CPC ..... *H04Q 2209/84* (2013.01); *H04Q 2209/88* (2013.01); *H04W 84/12* (2013.01)

(58) Field of Classification Search
CPC .. H04Q 2209/84; H04Q 2209/88; H04Q 9/00; H04W 84/12
See application file for complete search history.

(56) References Cited

U.S. PATENT DOCUMENTS

2018/0037174 A1 2/2018 Seegers
2018/0088157 A1 3/2018 Cocchini

OTHER PUBLICATIONS

Sentinel Alarm System, "Advanced Warning of Drainage System Backup", Jay R. Smith Mfg. Co, A Better Way, printed May 28, 2019, pp. 1-2.
Wirecutter, "The Best Smart Water-Leak Detector", A NY Times Company, Home and Garden, Smart Devices, Updated Feb. 6, 2019, pp. 1-20.

* cited by examiner

US 10,939,189 B1

OBSTRUCTION DETECTING SLEEVE FOR CONDUIT STRUCTURES

BACKGROUND OF THE INVENTION

This disclosure relates generally to detecting obstructions, and in particular, to an apparatus for detecting obstructions in conduit structures.

Conduit structures (e.g., water pipes and drain pipes) often experience obstruction events, which can result in significant damages if detection and action to correct the obstruction event is delayed. For example, water pipes can experience pressure fluctuations due to mineral buildup, where weakened portions of the water pipes are susceptible to failure due to the pressure fluctuations. In another example, drain pipes can experience an obstructions resulting in fluid being backed up until an obstruction is cleared. Presently, implementation of obstruction detecting systems for conduit structures (e.g., water and sewage lines) requires costly installation and modifications to the conduit structures, where portions of the conduit structure are replaced with the obstruction detecting systems. Furthermore, service disruptions can be experienced during the installation and modification of the conduit structures to implement the obstruction detecting systems.

SUMMARY

One aspect of an embodiment of the present invention discloses an apparatus for detecting an obstruction in a conduit structure, the apparatus comprising a sleeve portion, a plurality of sensor cells, a primary termination cap, and a secondary termination cap. The apparatus further comprising the plurality of sensor cells coupled to the sleeve portion, wherein each sensor cell from the plurality of sensor cells is electrically coupled to the primary termination cap and the secondary termination cap. The apparatus further comprising the sleeve portion configured to wrap around a circumference of a conduit structure, wherein each sensor cell from the plurality of sensor cells is directed to an exterior surface of the conduit structure. The apparatus further comprising the primary termination cap electrically and mechanically coupled to a first end of the sleeve portion, wherein the primary termination cap includes Wi-Fi transmitter, a primary microcontroller, and a power source connection. The apparatus further comprising the secondary termination cap electrically and mechanically coupled to a second end of the sleeve portion to short the plurality of sensor cells.

BRIEF DESCRIPTION OF THE SEVERAL VIEWS OF THE DRAWINGS

The following detailed description, given by way of example and not intended to limit the disclosure solely thereto, will best be appreciated in conjunction with the accompanying drawings, in which.

DETAILED DESCRIPTION

Figure 1A:
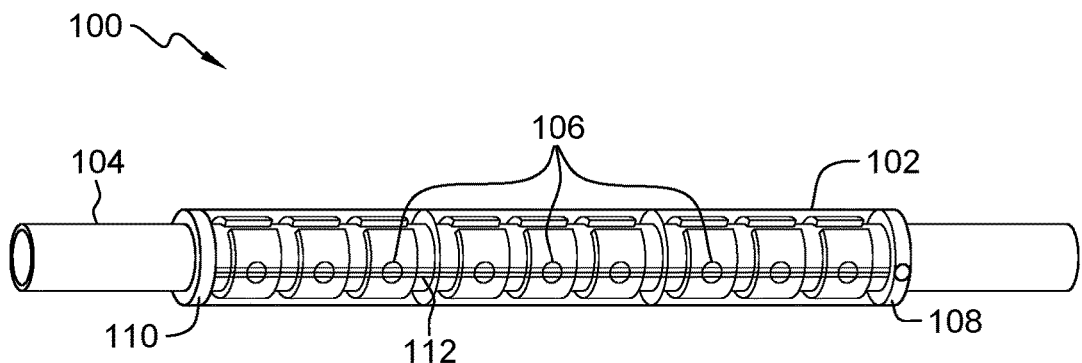
FIG. 1A depicts an obstruction detection device for a conduit structure, in accordance with an embodiment of the present invention.

Embodiments of the present invention provide a system that indicates the presence of an obstruction in a fluid carrying conduit structure, identifies the conduit structure with the obstruction, a location for the obstruction within the identified conduit structure, and provides one or more recommendation actions to alleviate the obstruction. The system allows for early detection of obstructions for instances when a visual indication of an issue is not immediately apparent and early detection of obstructions allows for more cost effective actions to be taken to alleviate the obstruction. The system also allows for rapid deployment and temporary installation without modifying an existing network of conduit structures.

The system includes a plurality of obstruction detection devices, where each obstruction detection device is coupled to a fluid carrying conduit structure in a network of conduit structures. The obstruction detection device includes a stretchable sleeve portion with a plurality of capacitive sensor cells integrated into the sleeve portion that surround the conduit structure, where a primary termination cap is affixed at one end and a secondary termination cap is affixed at another end. Each capacitive sensor cell includes a capacitive sensor circuit, a microcontroller, a memory storage device, and connection to the primary termination cap. The primary termination cap includes a Wi-Fi transmitter and a microcontroller for communication with a centralized hub operating an obstruction detection program. The secondary termination caps functions to short the wires electronically coupled to the plurality of capacitive sensor cells. The obstruction detection program can receive capacitance readings from each of the plurality of capacitive sensor cells via the Wi-Fi transmitter and determine, based on the capacitance, whether a fluid is present in the conduit structure. If an increased capacitance is maintained for a predefined amount of time, obstruction detection program generates a report and sends an alert to an administrative user that an obstruction is present in the conduit structure.

Detailed embodiments of the present invention are disclosed herein with reference to the accompanying drawings;

however, it is to be understood that the disclosed embodiments are merely illustrative of potential embodiments of the invention and may take various forms. In addition, each of the examples given in connection with the various embodiments is also intended to be illustrative, and not restrictive. This description is intended to be interpreted merely as a representative basis for teaching one skilled in the art to variously employ the various aspects of the present disclosure. In the description, details of well-known features and techniques may be omitted to avoid unnecessarily obscuring the presented embodiments.

For purposes of the description hereinafter, terms such as "upper", "lower", "right", "left", "vertical", "horizontal", "top", "bottom", and derivatives thereof shall relate to the disclosed structures and methods, as oriented in the drawing figures. Terms such as "above", "overlying", "atop", "on top", "positioned on" or "positioned atop" mean that a first element, such as a first structure, is present on a second element, such as a second structure, wherein intervening elements, such as an interface structure may be present between the first element and the second element. The term "direct contact" means that a first element, such as a first structure, and a second element, such as a second structure, are connected without any intermediary conducting, insulating or semiconductor layers at the interface of the two elements. The term substantially, or substantially similar, refer to instances in which the difference in length, height, or orientation convey no practical difference between the definite recitation (e.g. the phrase sans the substantially similar term), and the substantially similar variations. In one embodiment, substantial (and its derivatives) denote a difference by a generally accepted engineering or manufacturing tolerance for similar devices, up to, for example, 10% deviation in value or 10° deviation in angle.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

Many common fabrication techniques involve securing two objects using an adhesive layer between the objects. Oftentimes, the adhesive layer is chosen in an attempt to permanently secure the two objects together. And while this adhesive layer selection may be advantageous for typical usage of the overall product, there may be instances where separation of the joined objects is either desired, or necessary. In such instances, separation of the two objects, without physically damaging either of the objects, may be required so that one or both of the objects may be reused.

FIG. 1A depicts an obstruction detection device for a conduit structure, in accordance with an embodiment of the present invention. In this embodiment, obstruction detection device 100 includes sleeve portion 102 that surrounds a circumference of conduit 104, where conduit 104 is a non-metallic channel structure for conveying fluid. Sleeve portion 102 of obstruction detection device 100 wraps around a circumference of conduit 104, where sleeve portion 102 is adjustable to accommodate a varying diameter of conduit 104. The adjustable sleeve portion 102 of obstruction detection device 100 is discussed in further detail with regards to FIG. 2A. Obstruction detection device 100 can include one or more capacitive sensor cells 106 that surround conduit 104, where the one or more capacitive sensor cells 104 are integrated into sleeve portion 104 and are terminated at each end of obstruction detection device 100 with primary termination cap 108 and secondary termination cap 110. Capacitive sensor cells 106 represents a sensors capable of detecting and measuring anything that is conductive or has a dielectric different from air. In other embodiments, for metallic conduit structures, capacitive sensor cells 106 can be replaced with vibration sensors, temperature sensors, infrared sensors, and/or x-ray sensors. Vibrations sensors can detect pulsations due to fluid flow in the conduit structures and detect leaks or obstructions if there is a deviation from previously established vibration patterns. Temperature sensors can detect variations in temperatures in the conduit structures, indicating faults in fluid distribution or hot areas indicative of combustion.

Figure 4:
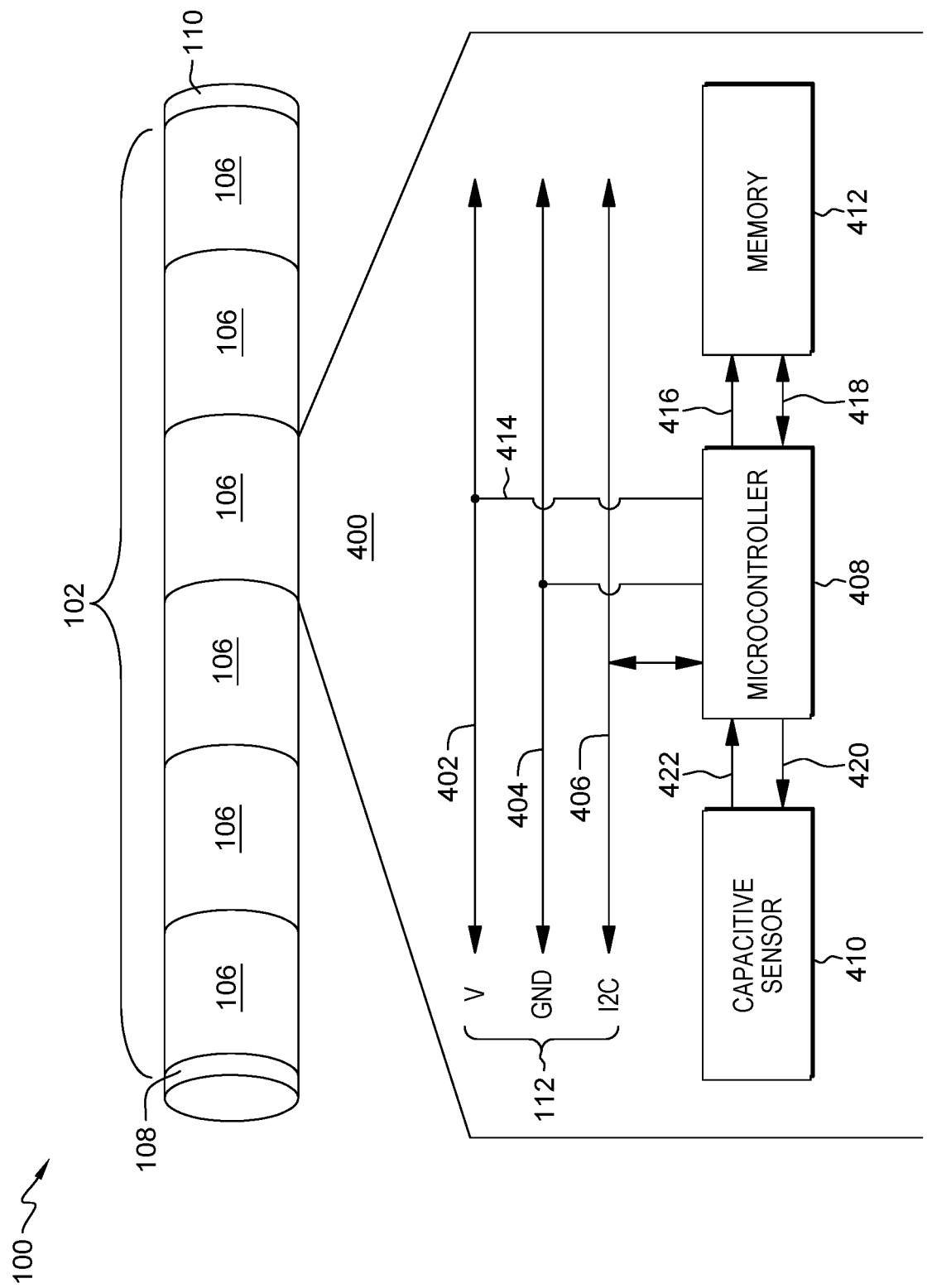
FIG. 4 depicts a block diagram for a single cell of an obstruction detecting device, in accordance with one embodiment of the present invention.

In this embodiment, obstruction detection device 100 includes nine capacitive sensor cells 106 connected to primary termination cap 108 and secondary termination cap 110 via lines 112, where lines 112 include a voltage line, a ground line, and I$^2$C (Inter-Integrated Circuit) line, discussed in further detail with regards to FIG. 4. Each capacitive cell 106 includes a capacitive sensor circuit, a microcontroller, a memory storage device, and an electrical connection to primary termination cap 108. Primary termination cap 108 includes a Wi-Fi transmitter and a microcontroller, where secondary termination cap 110 functions as a short for lines 112. A length of obstruction detection device 100 is modifiable based on sections 114 of sleeve portion 102 with the one or more capacitive sensor cells 104. In this embodiment, sleeve portion 102 of obstruction detection device 100 includes three sections 114, where each section 114 includes three capacitive sensor cells 106.

Primary termination cap 108 and secondary termination cap 110 are utilized to customize sleeve portions 102 for each unique application, where primary termination cap 108 and secondary termination cap 110 are each electrically coupled to each of capacitive sensor cells 106. In one embodiment, each of primary termination cap 108 and secondary termination cap 110 are metal mesh and/or thin metal plate structures with an inner diameter that conforms to an outer diameter of conduit 104, where each of primary termination cap 108 and secondary termination cap 110 conform to conduit 104 to form a first U-shaped portion and a second U-shaped portion, respectively. The utilization of the metal mesh and/or thin metal plate structures design of primary termination cap 108 and secondary termination cap 110 allows for installation without the removal of conduit 104, since the metal mesh and/or thin metal plate conform to the shape of conduit 104. Additionally, since primary termination cap 108 and secondary termination cap 110 can each include electrically circuitry, the first U-shaped portion can electrically couple to each of primary termination cap 108 and secondary termination cap 110.

In other embodiments, primary termination cap 108 and secondary termination cap 110 are adjustable ring structures with a varying inner diameter to match an outer diameter of conduit 104, where each of primary termination cap 108 and secondary termination cap 110 comprises a first U-shaped portion and a second U-shaped portion. A first end of the first U-shaped portion is insertable into a first end of the second U-shaped portion and a second end of first U-shaped portion is hinged to a second end of the second U-shaped portion. A hinge facilities the insertion movement of the first end of the first U-shaped portion into the first end of the second U-shaped portion, resulting in a varying diameter of either primary termination cap 108 or secondary termination cap 110. The hinge also provides an integrated electrical connection between the first U-shaped portion and the second U-shaped portion.

Figure 1B:
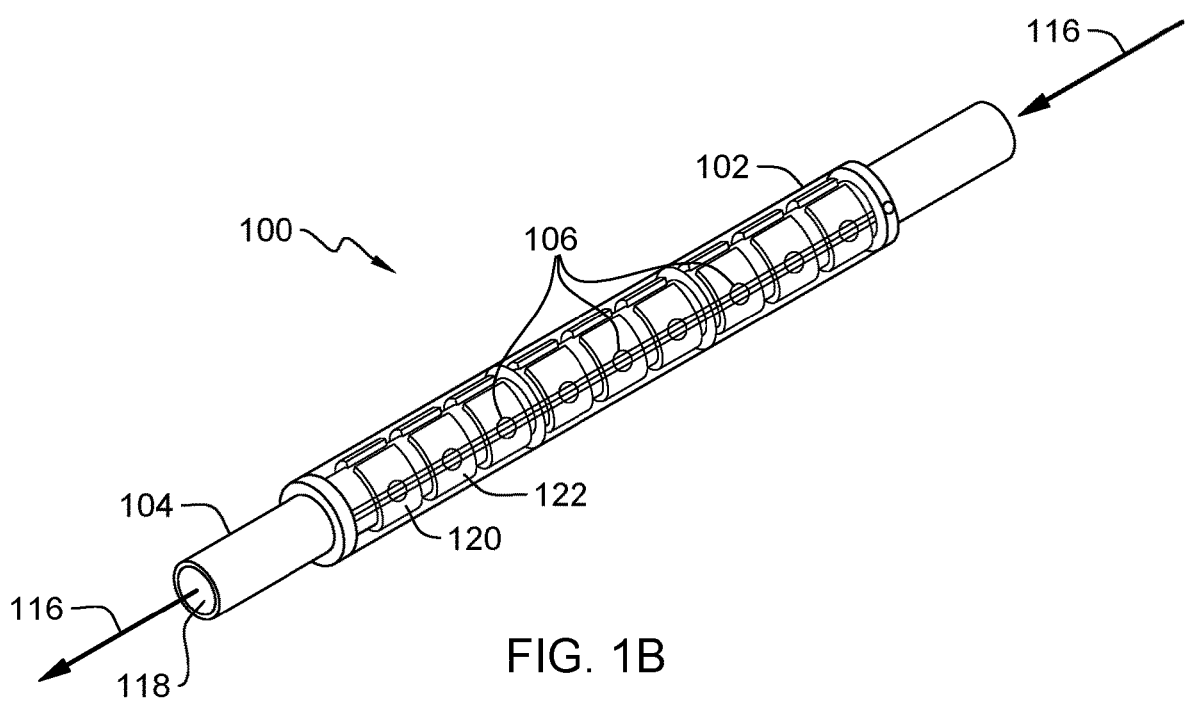
FIG. 1B depicts an orthographic view of an obstruction detection device for a conduit structure, in accordance with an embodiment of the present invention.

FIG. 1B depicts an orthographic view of an obstruction detection device for a conduit structure, in accordance with an embodiment of the present invention. Directional arrows 116 illustrate a direction of fluid flow through conduit 104, where obstruction detection device 100 measures a capacitance at each capacitive sensor cell 106 along sleeve portion 102 at set intervals. Prior to a fluid being introduced into conduit 104, each capacitive sensor cell 106 of obstruction detection device 100 is initialized and a base line capacitance reading is established for each capacitive sensor cell 106. In one example, conduit 104 is a 4-inch diameter polyvinyl chloride (PVC) pipe with a 1-mm capacitive wall thickness. Each capacitive sensor cell 106 establishes a capacitance reading for the PVC pipe with vacuum to be in the 10.5 pF<x<11.5 pF (picofarad) range. When water is present in the PVC pipe at a single capacitive sensor cell 106, the single capacitive sensor cell 106 generates a capacitance reading in the 41.5 pF<x<42.4 pF range. The variation in capacitance readings between the PVC pipe with vacuum and the PVC pipe with fluid, allows for obstruction detection device 100 to determine that fluid is present in a portion of the PVC pipe (i.e., conduit 104).

Instances where an obstruction is present in conduit 104, for example at area 118, fluid beings to accumulate within conduit 104 due to the obstruction impeding fluid flow. As fluid accumulates within conduit 104, fluid builds up at first capacitive sensor cell 120, followed by second capacitive sensor cell 122, and so forth down a length of sleeve portion 102 of obstruction detection device 100. As fluid builds up at the first capacitive sensor cell 120, a capacitance reading will increase from the previously baseline reading established when obstruction detection device 100 was initialized. As fluid continues to build up at the second capacitive sensor cell 122, a capacitance reading will increase from the previously baseline reading established when obstruction detection device 100 was initialized.

Figure 2A:
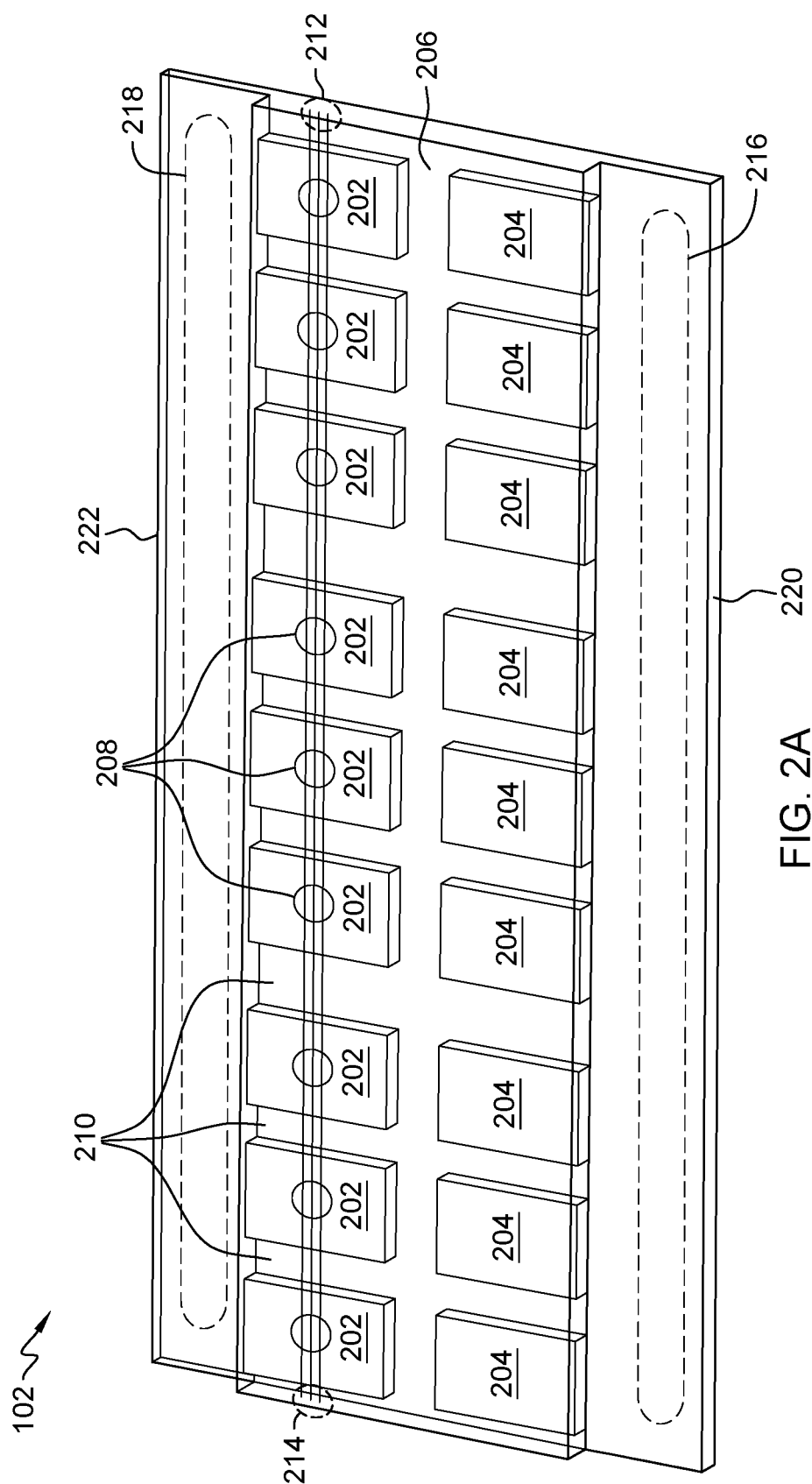
FIG. 2A depicts an obstruction detection device prior to installation on a conduit structure, in accordance with one embodiment of the present invention.

FIG. 2A depicts an obstruction detection device prior to installation on a conduit structure, in accordance with one embodiment of the present invention. In this embodiment, sleeve portion 102 of obstruction detection device 100 utilizes a flexible and stretchable fabric material to allow for sleeve portion 102 to conform to various diameter sizes of conduit 104. Top portion 202 of each capacitive sensor cell 106 is coupled to sleeve portion 102 in a first row and bottom portion 204 of a support structure is coupled to sleeve portion 102 in a second row, wherein the first row is at least partially in parallel to the second row. Furthermore, portion 206 of the flexible and stretchable fabric material separates the first row and the second row. Each top portion 202 of capacitive sensor cell 106 is electrically coupled to lines 112 at point 208, where lines 112 are flexible to allow for sleeve portion 102 to conform to a radius bend of conduit 102 (e.g., 90 degree bend). Furthermore, space 210 is present between each capacitive sensor cell 106 to allow for the flexible and stretchable fabric material to conform to the radius bend of conduit 102 without capacitive sensor cells 106 interfering with one another.

Primary connection point 212 located at a first end of lines 112, electrically couples lines 112 to primary termination cap 108 (not illustrated in FIG. 2A) utilizing a pin to pad electrical contact. Secondary connection point 214 located at a second end of lines 112, electrically couples lines 112 to secondary termination cap 110 (not illustrated in FIG. 2A) utilizing a pin to pad electrical contact. In some embodiment, a pin for each connection of line 112 extends beyond the first row of top portions 202 of capacitive sensor cells 106, where each pin for each connection of line 112 is placeable within a connector housing of either primary termination cap 108 or secondary termination cap 110. As sleeve portion 102 wraps around conduit 102, top portion 202 of each capacitive sensor cell 106 is disposed on a top portion of conduit 104 and a bottom portion of conduit 104 is disposed on bottom portion 204 of each accompanying support structure. Space 210 provides the additional flexible and stretchable fabric material to allow for the top portion 202 and bottom portion 204 of each support structure to conform to the circumference of conduit 104. Top area 216 and bottom area 218 of sleeve portion 102 utilizes one or more method of coupling first length end 220 of sleeve portion 102 to second length end 222 of sleeve portion 102, where first length end 220 is opposite second length end 222. In one embodiment, sleeve portion utilizes hook-and-loop fasteners to couple first length end 220 to second length end 222, wherein top area 216 includes a plurality of hooks and bottom area 218 includes a plurality of loops for interconnecting with the plurality of hooks. In another embodiment, sleeve portion 102 utilizes an adhesive to couple top area 216 to bottom area 218, where top area 216 and bottom area 218 include an abrasive surface to increase surface area adhesion between the adhesive, top area 216, and bottom area 218. In yet another embodiment, sleeve portion 102 utilizes a plurality of snap buttons to couple top area 216 to bottom area 218, where a top portion of each of the plurality of buttons are positioned on top area 216 and a bottom portion of each of the plurality of buttons are positioned on bottom area 218. The top portion of each of the plurality of buttons aligns with the bottom portion of each of the plurality of buttons.

Figure 2B:
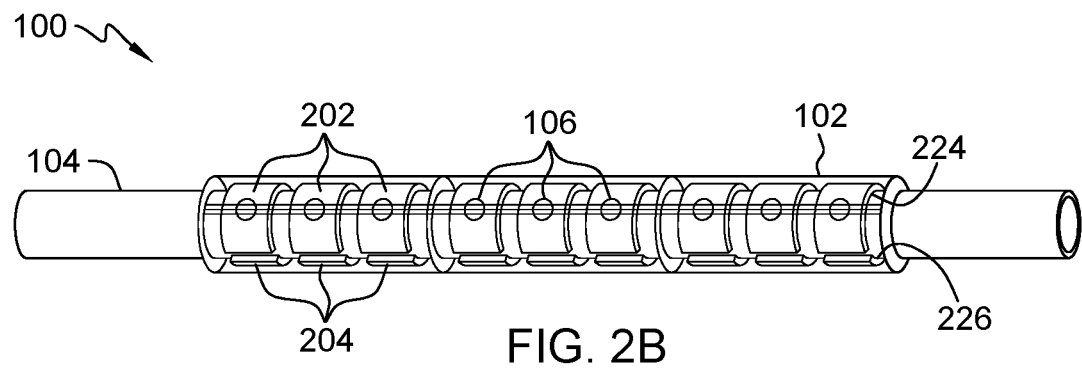
FIG. 2B depicts an obstruction detection device wrapped about a conduit structure, in accordance with one embodiment of the present invention.

FIG. 2B depicts an obstruction detection device wrapped about a conduit structure, in accordance with one embodiment of the present invention. As previously discussed, sleeve portion 102 of obstruction detection device 100 wraps around a circumference of conduit 104, where top portion 202 of each capacitive sensors cell 106 is located opposite bottom portion 204 of each support structure. As sleeve portion 102 wraps around conduit 102, top portion 202 of each capacitive sensor cell 106 is disposed on a top portion of conduit 104 and a bottom portion of conduit 104 is disposed on bottom portion 204 of each support structure. Furthermore, as sleeve portion 102 wraps around conduit, top area 216 couples to bottom area 218 (not illustrated in FIG. 2B), utilizing the one or more previously discussed methods (e.g., hook-and-loop fasteners). In this embodiment, inner radius 224 of each top portion 202 of capacitive sensor cell 106 is equal to an outer radius of conduit 104 and inner radius 226 of each bottom portion 204 of the support structure is equal to the outer radius of conduit 104. In other embodiments, inner radius 224 of each top portion 202 of capacitive sensor cell 106 is greater than an outer radius of conduit 104 and inner radius 226 of each bottom portion 204 of the support structure is greater than the outer radius of conduit 104. In other embodiments, bottom portion 204 of each accompanying support structure is not present, where sleeve portion 102 includes only top portion 202.

Figure 2C:
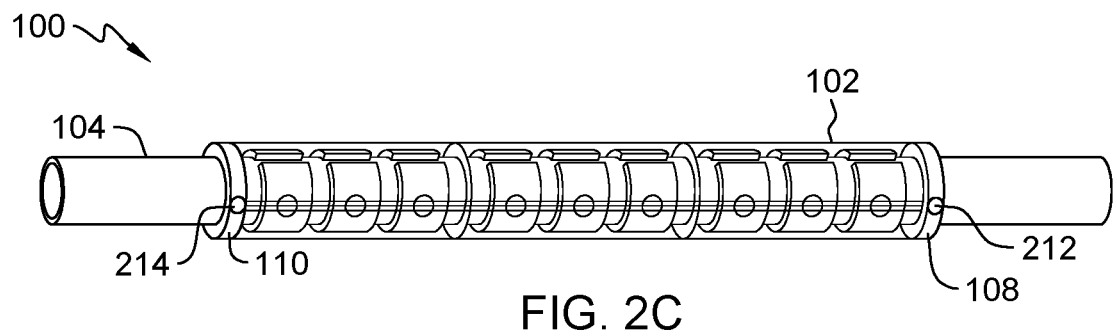
FIG. 2C depicts an obstruction detection device wrapped about a conduit structure with installed termination caps, in accordance with one embodiment of the present invention.

FIG. 2C depicts an obstruction detection device wrapped about a conduit structure with installed termination caps, in accordance with one embodiment of the present invention. Subsequent to sleeve portion 102 of obstruction detection device 100 being wrapped around conduit 104, primary termination cap 108 and secondary termination cap 110 are coupled to each end of sleeve portion 102. In this embodiment, primary termination cap 108 and secondary termination cap 110 each utilize a clamp style design with a first U-shaped portion and a second U-shaped portion. As previously discussed, the first U-shaped portion mechanically couples to the second U-shaped portion to create each of primary termination cap 108 and secondary termination cap 110. The first U-shaped portion is coupled to the second U-shaped portion utilizing one or more fasteners (e.g., screws, quick release clamp design). An electrical connection exists between the first U-shaped portion and the second U-shaped portion of primary termination cap 108 and secondary termination cap 110. In this embodiment, primary termination cap 108 includes a Wi-Fi transmitter, a microcontroller, and one or more battery cells for powering the multiple capacitive sensor cells 106. Furthermore, secondary termination cap 110 can also include one or more battery cells to supplement the one or battery cells of primary termination cap 108. In an alternative embodiment, primary termination cap 108 is electrically coupled to an external power source, such as an external battery pack or standard wired power source.

In an example scenario to calculate power requirements for obstruction detection device 100, several assumptions are established. A main microcontroller in primary termination cap 108 utilizes 277 mW (milliwatts) and a microcontroller associated with a single capacitive sensor cell 106 utilizes 105 mW. Furthermore, a total of 255 microcontrollers associated with 255 capacitive sensor cells 106 are utilized in obstruction detection device 100, where a six inch spacing is utilized between each capacitive sensor cell 106. An average of two seconds are required to initialize a single capacitive sensor cell 106, capture a capacitance reading, and transmit the capacitance reading. Obstruction detection device 100 is configured to capture and transmit the capacitance reading twice a day, where a total yearly power on time is equal to 1460 seconds=(2 sec.)(2 times)(365 days), or 24.3 minutes, or 0.405 hours. Calculating the yearly power consumption for the main microcontroller and the 255 microcontrollers for the 255 capacitive sensor cells 106 is equal to 10.97 Wh (watt-hours)=(0.405 hours)(0.277 mW+[(0.105 mW)(255 microcontrollers)]). A single 9 Volt battery provides 5.49 Wh, where four 9 Volt batteries integrated across primary termination cap 108 and secondary termination cap 110 would allow for 2 years of operation prior to requiring battery replacement. In another example scenario, 45 microcontrollers associated with 45 capacitive sensor cells 106 are utilized for obstruction detection device 100. Calculating the yearly power consumption for the main microcontroller and the 45 microcontrollers for the 45 capacitive sensor cells 106 is equal to 2.03 Wh (watt-hours)=(0.405 hours)(0.277 mW+ [(0.105 mW)(45 microcontrollers)]). As previously mentioned, a single 9 Volt battery provides 5.49 Wh and would allow for over 2.7 years of operation prior to requiring battery replacement.

Figure 3A:
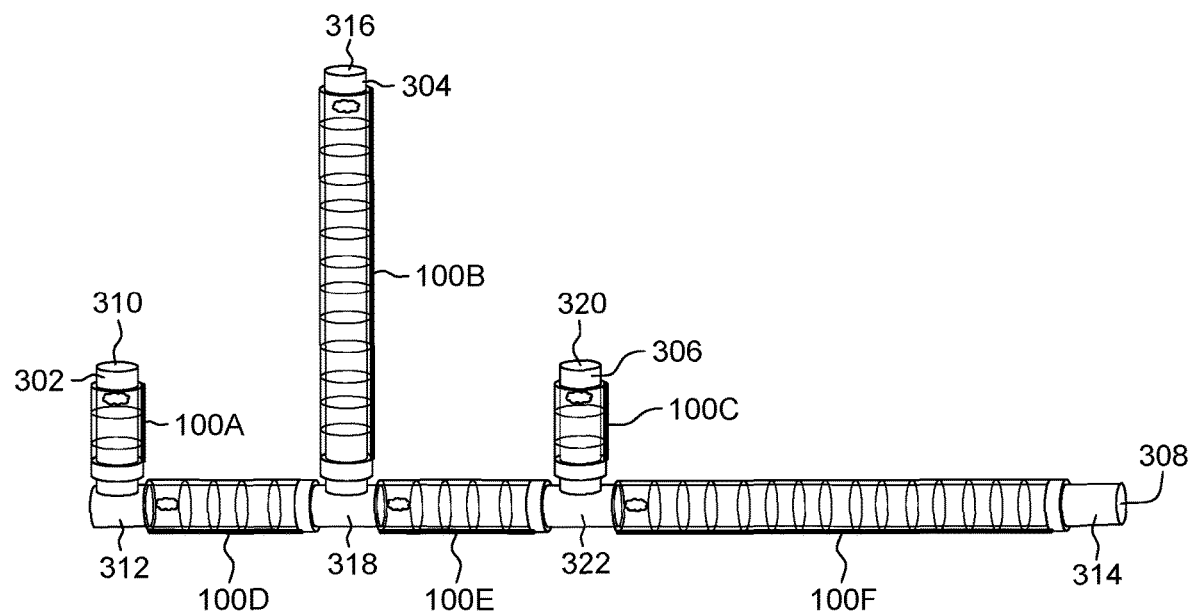
FIG. 3A depicts a plurality of conduit structures with a plurality of obstruction detection devices in an obstruction detection system, in accordance with one embodiment of the present invention.

FIG. 3A depicts a plurality of conduit structures with a plurality of obstruction detection devices in an obstruction detection system, in accordance with one embodiment of the present invention. Conduit network 300 includes conduit structures 302, 304, 306, and 308, where conduit structures 302, 304, and 306 feed into conduit structure 308. Fluid entering conduit structure 302 at inlet 310, flows down conduit structure 302 towards joint 312 connecting conduit structure 302 to conduit structure 308, and exits conduit structure 308 at outlet 314. Fluid entering conduit structure 304 at inlet 316, flows down conduit structure 304 towards joint 318 connecting conduit structure 304 to conduit structure 308, and exits conduit structure 308 at outlet 314. Fluid entering conduit structure 306 at inlet 320, flows down conduit structure 306 towards joint 322 connecting conduit structure 306 to conduit structure 308, and exits conduit structure 308 at outlet 314. Obstruction detection device 100A, 100B, and 100C are coupled along a length of conduit structure 302, 304, and 306, respectively. Obstruction detection device 100D is coupled along a length of conduit structure 308, located between conduit structure 302 and 304. Obstruction detection device 100E is coupled along a length of conduit structure 308, located between conduit structure 304 and 306. Obstruction detection device 100D is coupled along a length of conduit structure 308, located between conduit structure 306 and outlet 314. Obstruction detection device 100A-F include primary termination caps 108A-F and secondary termination caps 110A-F, respectively. Primary termination caps 108A-F each include a microcontroller, one or more battery cells, and a Wi-Fi transmitter for communication with a centralized hub operating an obstruction detection program, discussed in further detail with regards to FIG. 5.

In this embodiment, obstruction detection device 100A includes two capacitive sensor cells positioned along sleeve portion 102A, obstruction detection device 100B includes twelve capacitive sensor cells positioned along sleeve portion 102B, obstruction detection device 100C includes two capacitive sensor cells positioned along sleeve portion 102C, obstruction detection device 100D includes four capacitive sensor cells positioned along sleeve portion 102D, obstruction detection device 100E includes four capacitive sensor cells positioned along sleeve portion 102E, and obstruction detection device 100F includes fourteen capacitive sensor cells positioned along sleeve portion 102F. Obstruction detection program initializes obstruction detection device 100A-F, establishes a location for each obstruction detection devices 100A-F based on a location of each respective Wi-Fi transmitter, and establishes baseline capacitance readings for every capacitive sensor cell positioned along sleeves 102A-F, respectively. Obstruction detection program utilizes the baseline capacitance readings to compare future capacitance readings to determine whether an obstruction is present in conduit network 300.

Figure 3B:
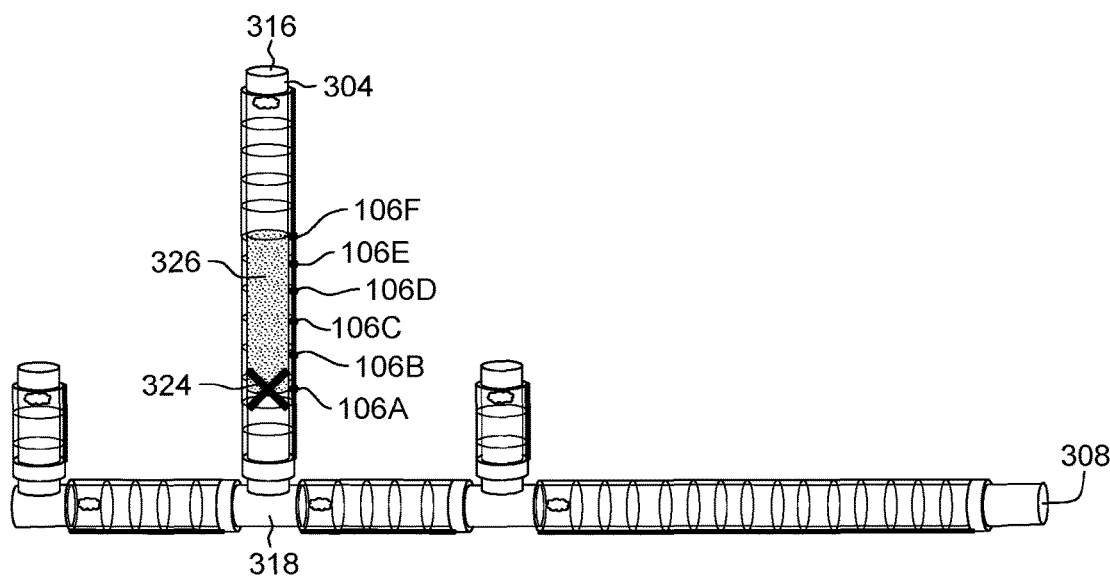
FIG. 3B depicts an obstruction detection device detecting an obstruction in a conduit structure in an obstruction detection system, in accordance with one embodiment of the present invention.

FIG. 3B depicts an obstruction detection device detecting an obstruction in a conduit structure in an obstruction detection system, in accordance with one embodiment of the present invention. In this embodiment, obstruction 324 is present in conduit structure 304, where obstruction 324 is impeding fluid flow down conduit structure 304 towards joint 318 connecting conduit structure 304 to conduit structure 308. As an amount of fluid builds (i.e., backs-up) in conduit structure 304, capacitive sensor cell 106A of obstruction detection device 100B detects an increase in capacitance due to the fluid being present in conduit structure 304. As the amount of fluid continues to build, capacitive sensor cell 106B-F of obstruction detection device 100B sequentially detect an increase in capacitance due to the fluid being present in conduit structure 304. Each capacitive sensor cell 106 (e.g., capacitive sensor cell 106A) is associated with a specific obstruction detection device 100 (e.g., obstruction detection device 100B) and each obstruction detection device is associated with a specific conduit structure (e.g., conduit structure 304). Therefore, obstruction detection program has the ability to notify a user with a specific location for obstruction 324 in conduit network 300, where the specific location identifies one or more of a conduit structure (i.e., conduit structure 304) location in a structure (e.g., office building), a specific obstruction detection device 100 (i.e., obstruction detection device 100B), and one or more capacitive sensor cells experiencing an increase in capacitance (i.e., capacitive sensor cells 106A-F).

FIG. 4 depicts a block diagram for a single cell of an obstruction detection device, in accordance with one embodiment of the present invention. In this embodiment, six capacitive sensor cells 106 are positioned on sleeve portion 102 of obstruction detection device 100 between primary termination cap 108 and secondary termination cap 110. Cell block diagram 400 represents a single capacitive sensor cell 106 from obstruction detection device 100. Lines 112 of obstruction detection device 100 includes voltage line 402, ground line 404, and I²C (Inter-Integrated Circuit) line 406. The single capacitive sensor cell 106 includes microcontroller 408, capacitive sensor 410, and memory 412. Voltage line 402 supplies voltage to microcontroller 408 via line 414 and microcontroller 408 supplies voltage to memory 412 via line 416, where Read/Write operations performed by microcontroller 408 are transmitted and received via data line 418. Microcontroller 408 generates a frequency via line 420 which is utilized by capacitive sensor 410 to register a capacitance reading, where capacitive sensor 410 relays the capacitance reading back to microcontroller 408 via line 422. Microcontroller 408 relays the capacitance reading to a primary microcontroller and Wi-Fi transmitter located in primary termination cap 108 via I²C line 406 for transmission to obstruction detection program.

The terminology used herein is for the purpose of describing particular embodiments only and is not intended to be limiting to the invention. As used herein, the singular forms "a", "an" and "the" are intended to include the plural forms as well, unless the context clearly indicates otherwise.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable other of ordinary skill in the art to understand the embodiments disclosed herein. It is therefore intended that the present invention not be limited to the exact forms and details described and illustrated but fall within the scope of the appended claims.

Figure 5:
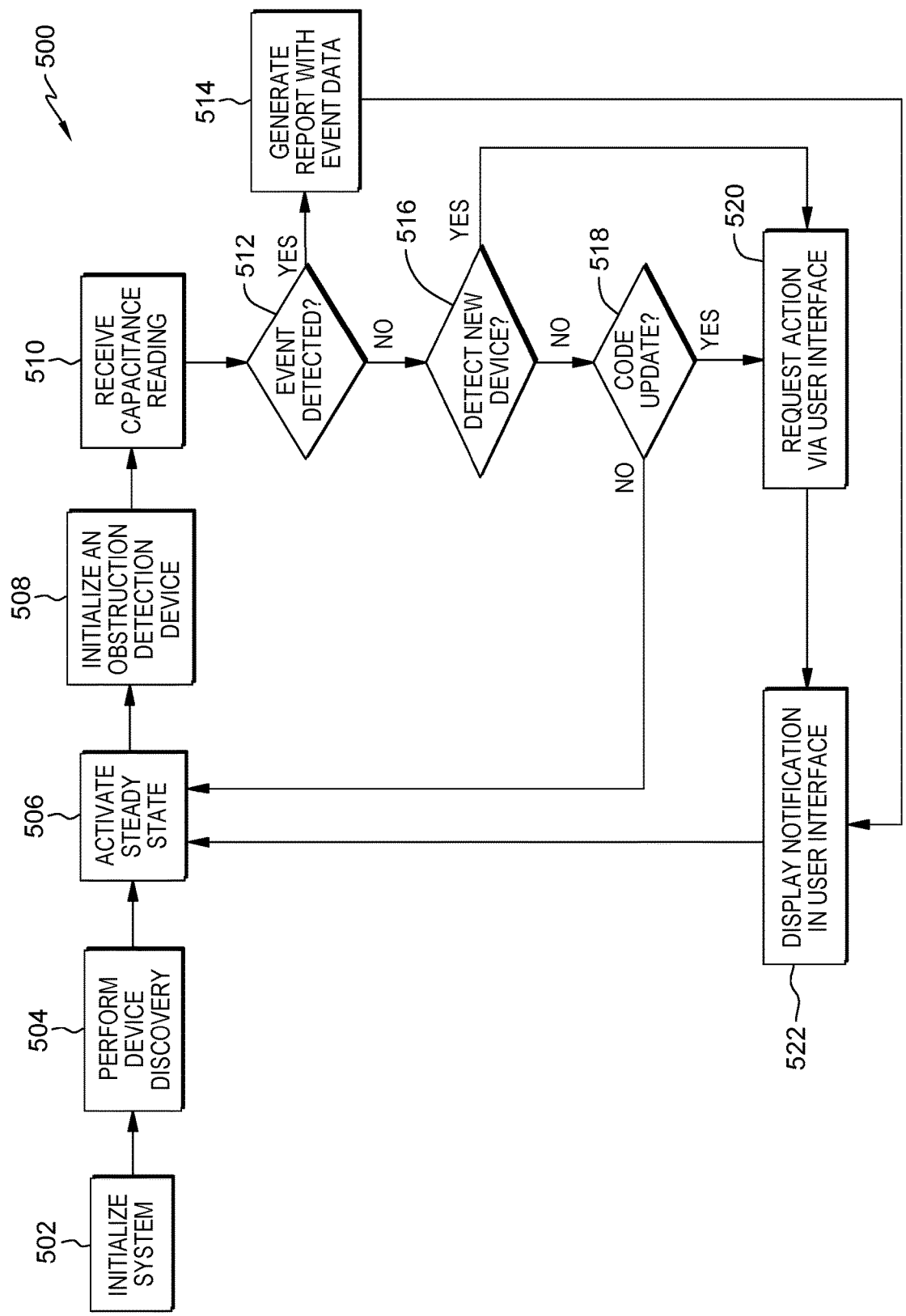
FIG. 5 is a process flow for an obstruction detection program for detecting an obstruction in a conduit structure, in accordance with one embodiment of the present invention.

FIG. 5 is a process flow for an obstruction detection program for detecting an obstruction in a conduit structure, in accordance with one embodiment of the present invention.

Obstruction detection program 500 initializes (502) the system. Obstruction detection program 500 operates on a centralized hub (e.g., server computer) for managing a network of obstruction detection devices located at one or more locations. In one embodiment, the centralized hub manages a plurality of obstruction detection devices in a single structure, where the single structure is a private residence. Each of the plurality of obstruction detection devices are installed on non-metallic fluid transferring conduits (i.e., PVC pipes) located through-out the private residence. Each of the plurality of obstruction detection devices are connected to a private Wi-Fi network and are each capable of communicating with obstruction detection program 500 operating on the centralized hub. In another embodiment, the centralized hub manages a plurality of obstruction detection devices coupled to a network of conduits that are integrated into an irrigation system, where the network of conduits deliver water to farmland. In yet another embodiment, the centralized hub manages a plurality of obstruction detection devices on a vehicle, where the plurality of obstruction detection devices are coupled to non-metallic coolant and fuel lines on the vehicle. The plurality of obstruction detection devices can be integrated into the vehicle such that power is received from the onboard 12-volt battery and the centralized hub operating obstruction detection program 500 can be integrated into the Engine Control Unit (ECU).

Obstruction detection program 500 performs (504) device discovery. Obstruction detection program 500 performs an obstruction detection device discovery via I²C and an address assignment for each of the obstruction detection devices. Each obstruction detection device includes a primary termination cap with an integrated Wi-Fi transmitter and primary microcontroller for communicating with obstruction detection program 500 operating on the centralized hub. Obstruction detection program 500 can utilize one or more of an address assignment, a serial number, and a location based on the Wi-Fi transmission to identify each obstruction detection device from the plurality of obstruction devices operating in the network. Obstruction detection program 500 allows the user to provide a customizable name (e.g., coolant feed line A, sewer line B) for each of the plurality of obstruction detection devices that obstruction detection program 500 discovers.

Obstruction detection program 500 calibrates each of the plurality of obstruction detection devices to establish baseline capacitance readings for each capacitive sensor cell located on a sleeve portion on each of the obstruction detection device. In one embodiment, obstruction detection program 500 establishes baseline capacitance readings for an instance when there is no fluid present in the conduit structure to which the obstruction detection device is attached. In another embodiment, obstruction detection program 500 established two baseline capacitance readings, a first baseline capacitance reading for an instance when there is no fluid present in the conduit structure and a second baseline capacitance reading for an instance when there is fluid flowing (i.e., not stagnant) in the conduit structure. Obstruction detection program 500 utilizes the baseline capacitance readings when determining whether an event has been detected in one or more of the obstruction detection devices.

Obstruction detection program 500 activates (506) a steady state. In this embodiment, obstruction detection program 500 activates a steady state by powering down the plurality of obstruction detection device to conserve power until an initialization parameter is reached. The initialization parameter is utilized by obstruction detection program 500 as trigger event to initialize the plurality of obstruction detection devices to obtain capacitance readings.

Obstruction detection program 500 initializes (508) an obstruction detection device. In one embodiment, obstruction detection program 500 utilizes a time based initialization parameter, where obstruction detection program 500 initializes each obstruction detection device in pre-determined time intervals defined by an administrative user. For example, obstruction detection program 500 utilizes a 10 minutes interval initialization parameter, where obstruction detection program 500 initializes each of the plurality of obstruction detection devices every 10 minutes. In another embodiment, obstruction detection program 500 utilizes an event based initialization parameter, where obstruction detection program 500 initializes each obstruction detection devices in response to an event occurring. For example, the centralized hub can be paired to a proximity faucet, where an activation of the proximity faucet (i.e., water flowing) represents an event based initialization parameter for obstruction detection program 500 to initialize each of the obstruction detection devices. Obstruction detection program 500 can also utilize multiple event based initialization parameters, where each of the multiple event based initialization parameters initializes a portion of the plurality of obstruction detection devices operating in the network. Furthermore, obstruction detection program 500 can receive a request from the administrative user to initialize one or more of the plurality of obstruction detections to receive capacitance readings.

Obstruction detection program 500 receives (510) capacitance readings from the obstruction detection device. In this embodiment, obstruction detection program 500 receives a capacitance reading from each capacitive sensor cell located on a sleeve portion of each obstruction detection device. Since obstruction detection program 500 previously performed an obstruction detection device discovery in (504), obstruction detection program 500 receives the capacitance readings for each capacitive sensor cell and associates each capacitance reading with a specific location in the network of obstruction detection devices.

Obstruction detection program 500 determines (512) whether an event has been detected. In the event obstruction detection program 500 determines an event has been detected ("yes" branch, 512), obstruction detection program 500 generates (514) a report with the event data. In the event obstruction detection program 500 determines an event has not been detected ("no" branch, 512), obstruction detection program 500 determines (516) whether a new device has been detected. An event can represent an obstruction in a conduit structure to which a specific obstruction detection device is coupled or can represent an anomaly, where one or more capacitive sensor cells are producing abnormal or conflicting capacitance readings. The anomaly can be caused by one or more failing capacitive sensors or damaged circuitry due to an external influence.

Obstruction detection program 500 can utilize a threshold level to determine whether an event has been detected. Since, obstruction detection program 500 previously established baseline capacitance readings during the initial calibration of the capacitive sensors cells for each obstruction detection device, obstruction detection program 500 can utilize a percentage based deviation from the baseline capacitance readings as the threshold level. For example, obstruction detection program 500 establishes a baseline capacitance reading of 11 pF for a single capacitive sensor cell, where obstruction detection program 500 utilizes a 200% deviation threshold to determine if an event has occurred. Subsequently, obstruction detection program 500 receives a capacitive reading of 35 pF, which represents a 318% deviation from the baseline capacitance reading. Obstruction detection program 500 determines that an event has been detected since the 318% baseline deviation exceeds the deviation threshold (i.e., 200%). In another embodiment, obstruction detection program 500 can utilize a capacitive reading threshold to determine whether an event has been detected. For example, obstruction detection program 500 establishes a baseline capacitance reading of 15 pF for a single capacitive sensor cell, where obstruction detection program 500 utilizes a 40 pF threshold to determine if an event has occurred. Subsequently, obstruction detection program 500 receives a capacitive reading of 42 pF, which exceeds the capacitive reading threshold (i.e., 40 pF), and obstruction detection program 500 determines that an event has been detected.

Instances where obstruction detection program 500 receives a capacitance reading from a capacitive sensor cell that is less than a baseline capacitance reading, obstruction detection program 500 determines an anomaly has occurred and determines an even has been detected. Obstruction detection program 500 can utilize one or more predetermined ranges to determine whether an anomaly has occurred for any of the capacitive sensors, where a capacitance reading outside of the predetermined range is considered an anomaly. For example, if obstruction detection program 500 establishes a baseline capacitance reading of 11 pF, obstruction detection program 500 can utilize a lower predetermined range of 10 pF<x<11 pF and a higher predetermined range of 11 pF<x<100 pF. If obstruction detection program 500 receives a capacitive reading that does not fall into the lower predetermined range or the higher predetermined range, obstruction detection program 500 determines an anomaly has occurred and determines an event has been detected. Additionally, if obstruction detection program 500 does not receive a capacitance reading from a capacitive sensor cell, obstruction detection program 500 determines an anomaly has occurred and determines an event has been detected.

Obstruction detection program 500 generates (514) a report with the event data. For an obstruction or anomaly based event, obstruction detection program 500 generates a report with event data for the obstruction detection device associated with the one or more capacitive sensors that generated a capacitance reading that resulted in the event detection. The report identifies whether the detected event is an obstruction based event or an anomaly based event. The event data can include a location and a serial number for a specific obstruction detection device that resulted in the event detection, along with an identification of one or more capacitive sensor cells located on the sleeve portion of the specific obstruction detection device that resulted in the event detection. The event data can also include one or more of: the baseline capacitance reading, the capacitance reading that resulted in the event detection, a threshold level for the event detection, a lower pre-determined range, a higher pre-determined range, a time of occurrence, one or more recommendation actions to alleviate the obstruction based event, and one or more recommendation actions to alleviate the anomaly based event.

An example of the one or more recommendation actions to alleviate the obstruction based event can include activating a vibration generating device coupled to the conduit structure to allow for unique vibration patterns at the location of the obstruction to disintegrate and/or dislodge. Another example of the one or more recommendation actions to alleviate the obstruction based event can include step by step instructions on how to mechanically decouple a specific conduit structure from the network conduit structure, so that the obstruction can be removed. Another example of the one or more recommendation actions to alleviate the obstruction based event can include activating one or more chambered, independent, and inflatable members which can be deployed based on the location of the obstruction. Examples of the one or more recommendation actions to alleviate the anomaly based event can include a recommendation to replace the one or more capacitive sensors cells causing the anomaly based event, a recommendation to replace a power source for the obstruction detection device, and a recommendation to entirely replace the obstruction detection.

Obstruction detection program 500 determines (516) whether a new device has been detected. In the event obstruction detection program 500 determines a new device has not been detected ("no" branch, 516), obstruction detection program 500 determines (518) whether a code update is available. In the event obstruction detection program 500 determines a new device has been detected ("yes" branch, 516), obstruction detection program 500 requests (520) an action via a user interface.

Obstruction detection program 500 determines whether a new device has been detected by preforming a device discovery. Obstruction detection program 500 performs an obstruction detection device discovery via I²C and an address assignment for each of the new obstruction detection devices. As previously discussed, each obstruction detection device includes a primary termination cap with an integrated Wi-Fi transmitter and primary microcontroller for communicating with obstruction detection program 500 operating on the centralized hub. Obstruction detection program 500 can utilize one or more of an address assignment, a serial number, and a location based on the Wi-Fi transmission to identify a new obstruction detection device from the existing plurality of obstruction devices operating in the network. Obstruction detection program 500 requests action from the administrative user via user interface, where the action includes confirming whether or not to add the newly discovered obstruction detection device to the existing plurality of obstruction detection devices in the network.

Obstruction detection program 500 determines (518) whether a code update is available. In the event obstruction detection program 500 determines a code update is available, obstruction detection program 500 requests (520) an action via a user interface. Obstruction detection program 500 requests action from the administrative user via the user interface, where the action includes approving or declining a code update for each of the plurality of obstruction detection devices in the network. In the event obstruction detection program 500 determines a code update is not available, obstruction detection program 500 reverts back and activates (506) the steady state.

Obstruction detection program 500 requests (520) an action via a user interface. In the event a new device has been detected, obstruction detection program 500 requests action from the administrative user via the user interface, where the action includes confirming whether or not to add the newly discovered obstruction detection device to the existing plurality of obstruction detection devices in the network. In the event a code update is available for the plurality of obstruction detection devices, obstruction detection program 500 requests action from the administrative user via the user interface, where the action includes approving or declining a code update for each of the plurality of obstruction detection devices in the network.

Obstruction detection program 500 displays (522) a notification in the user interface. In the event, obstruction detection program 500 requests action from the administrative user via the user interface, obstruction detection program 500 displays the notification for a pending request in the user notification. As previously discussed, the request for action relates to the detection of a new obstruction detection device or an available code update for the plurality of obstruction detection devices. Subsequently, obstruction detection program 500 displays one or more user selectable options (e.g., approve code update, decline code update, approve newly discovered obstruction detection device, decline newly discovered obstruction device) for responding to the request for action. In the event, obstruction detection program 500 generates a report with event data for the obstruction or anomaly based event, obstruction detection program 500 display a notification that a report for a detected event is available for viewing. Subsequently, obstruction detection program 500 displays the generated report with event data in the user interface.

Figure 6:
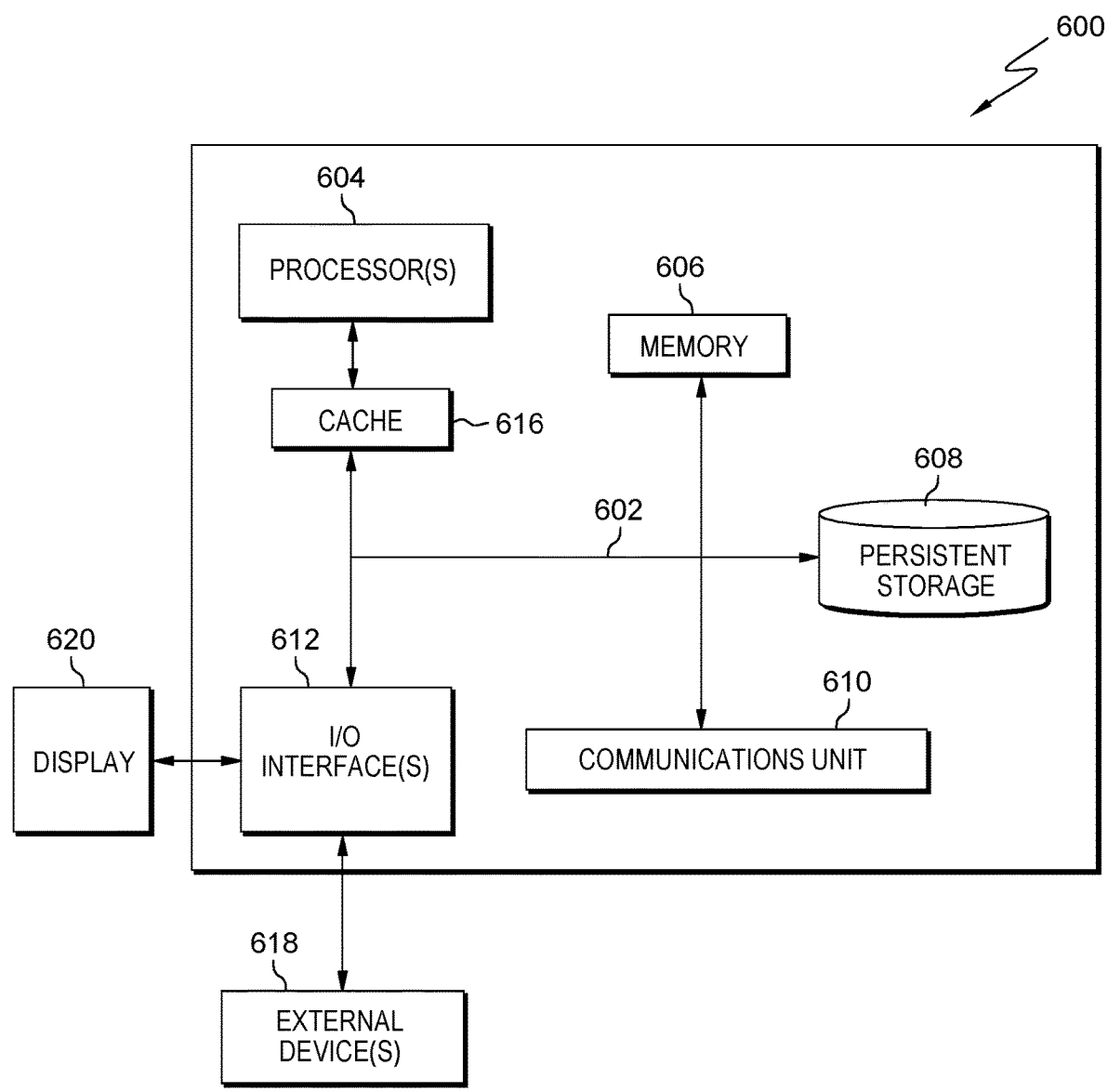
FIG. 6 depicts a block diagram of components of a computer system for performing the operational steps of obstruction detection program, in an embodiment, in accordance with the present invention.

FIG. 6 depicts a block diagram of components of a computer system for performing the operational steps of obstruction detection program 500, in an embodiment, in accordance with the present invention. Computer system 600 represents a centralized hub (e.g., server computer) on which obstruction detection program 500 operates. The computer system includes processors 604, cache 616, memory 606, persistent storage 608, communications unit 610, input/output (I/O) interface(s) 612 and communications fabric 602. Communications fabric 602 provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 602 includes random access memory (RAM). In general, memory 606 can include any suitable volatile or non-volatile computer readable storage media. Cache 616 is a fast memory that enhances the performance of processors 604 by holding recently accessed data, and data near recently accessed data, from memory 606.

Program instructions and data used to practice embodiments of the present invention may be stored in persistent storage 608 and in memory 606 for execution by one or more of the respective processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Program instructions and data used to practice embodiments of the present invention may be downloaded to persistent storage 608 through communications unit 610.

I/O interface(s) 612 allows for input and output of data with other devices that may be connected to each computer system. For example, I/O interface 606 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention can be stored on such portable computer readable storage media and can be loaded onto persistent storage 608 via I/O interface(s) 612. I/O interface(s) 612 also connect to display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. An apparatus for detecting an obstruction in a conduit structure, the apparatus comprising:
 a sleeve portion, a plurality of sensor cells, a primary termination cap, and a secondary termination cap;
 the plurality of sensor cells coupled to the sleeve portion, wherein each sensor cell from the plurality of sensor cells is electrically coupled to the primary termination cap and the secondary termination cap;
 the sleeve portion configured to wrap around a circumference of a conduit structure, wherein each sensor cell from the plurality of sensor cells is directed to an exterior surface of the conduit structure;
 the primary termination cap electrically and mechanically coupled to a first end of the sleeve portion, wherein the primary termination cap includes a Wi-Fi transmitter, a primary microcontroller, and a power source connection; and
 the secondary termination cap electrically and mechanically coupled to a second end of the sleeve portion to short the plurality of sensor cells.

2. The apparatus of claim 1, wherein each sensor cell from the plurality of sensor cells is selected from a group consisting of: a vibration sensor, a temperature sensor, an infrared sensor, and an x-ray sensor.

3. The apparatus of claim 1, wherein the plurality of sensor cells are a plurality of capacitive sensor cells.

4. The apparatus of claim 3, wherein each capacitive sensor cell from the plurality of capacitive sensor cells further comprises:
 a secondary microcontroller, a capacitive sensor, and a memory storage device, wherein the secondary microcontroller is electrically coupled to the capacitive sensor, wherein the secondary microcontroller is electrically coupled to the primary microcontroller.

5. The apparatus of claim 3, wherein the sleeve portion further comprises:
 a first length end and a second length end, wherein the first length end is opposite the second length end; and
 a top area of the first length end is placeable on a bottom area of the second length end, wherein the top area of the first length end is configured to couple to the bottom area of the second length end.

6. The apparatus of claim 5, wherein a plurality of hook-and-loop fasteners couples the top area of the first length end to the second length end.

7. The apparatus of claim 5, wherein an adhesive couples the top area of the first length end to the second length end.

8. The apparatus of claim 3, wherein the primary termination cap includes one or more battery cells electrically coupled to the power source connection, wherein the power source connection electrically couples the one or more battery cells to the plurality of capacitive sensor cells.

9. The apparatus of claim 3, wherein the primary termination cap is electrically coupled to a wired power source, wherein the power source connection electrically couples the wired power source to the plurality of capacitive sensor cells.

10. The apparatus of claim 3, wherein the primary termination cap further comprises:
 a first U-shaped portion of the primary termination cap and a second U-shaped portion of the primary termination cap, wherein the first U-shaped portion of the primary termination cap is configured to couple to the second U-shaped portion the primary termination cap to clamp onto the conduit structure.

11. The apparatus of claim 10, wherein the secondary termination cap further comprises:
 a first U-shaped portion of the secondary termination cap and a second U-shaped portion of the secondary termination cap, wherein the first U-shaped portion of the secondary termination cap is configured to couple to the second U-shaped portion the secondary termination cap to clamp onto the conduit structure.

12. The apparatus of claim 3, wherein the primary termination cap further comprises:
 a first U-shaped portion of the primary termination cap and a second U-shaped portion of the primary termination cap, wherein a first end of the first U-shaped portion is insertable into a first end of the second U-shaped portion of the primary termination cap, wherein a second end of the first U-shaped portion of the primary termination cap is hinged to a second end of the second U-shaped portion of the primary termination cap.

13. The apparatus of claim 12, further comprises:
 a hinge mechanically and electrically couples the second end of the first U-shaped portion of the primary termination cap and the second end of the second U-shaped portion of the primary termination cap.

14. The apparatus of claim 12, wherein the secondary termination cap further comprises: a first U-shaped portion of the secondary termination cap and a second U-shaped portion of the secondary termination cap, wherein a first end of the first U-shaped portion of the secondary termination cap is insertable into a first end of the second U-shaped portion of the secondary termination cap, wherein a second end of the first U-shaped portion of the secondary termination cap is hinged to a second end of the second U-shaped portion of the secondary termination cap.

15. A method comprising:
 initializing, by one or more processors, an obstruction detection device, wherein the obstruction detection device includes a plurality of capacitive sensor cells for capturing capacitance readings on a conduit structure;
 establishing, by the one or more processors, a baseline capacitance reading for each of the plurality of capacitive sensor cells, wherein the baseline capacitance reading for each of the plurality of capacitive sensor cells is for an instance when there is no fluid present in the conduit structure;
 responsive to receiving a plurality of capacitance readings for the plurality of capacitive sensor cells, determining, by the one or more processors, whether an obstruction event in the conduit structure is detected based on a deviation from a baseline capacitance reading for at least one capacitance reading from the plurality of capacitance readings; and
 responsive to determining the obstruction event in the conduit structure is detected, generating, by the one or more processors, a report based on event data associated with the detected obstruction event, wherein the report identifies at least one capacitive sensor cell from the plurality of capacitive sensor cells associated with the at least one capacitance reading responsible for the detected obstruction event.

16. The method of claim 15, wherein determining whether the obstruction event in the conduit structure is detected based on the deviation from the baseline capacitance reading for the at least one capacitive reading further comprises:
   determining, by the one or more processors, a plurality of percentage deviations, wherein each percentage deviation from the plurality of percentage deviations represents a difference between a baseline capacitance reading for one capacitance reading of the plurality of capacitance readings and the one capacitance reading of the plurality of capacitance readings; and
   responsive to determining a specific percentage deviation from the plurality of percentage deviations exceed a percentage deviation threshold, determining, by the one or more processors, the obstruction event has occurred in the conduit structure at a location of a specific capacitive sensor responsible for the specific percentage deviation.

17. The method of claim 16, wherein determining whether the obstruction event in the conduit structure is detected based on the deviation from the baseline capacitance reading for the at least one capacitance reading further comprises:
   responsive to determining a specific capacitance from the received plurality of capacitance readings exceeds a predetermined capacitance threshold, determining, by the one or more processors, the obstruction event has occurred in the conduit structure at a location of a specific capacitive sensor responsible for sensing the specific capacitance.

18. The method of claim 16, further comprising:
   responsive to an event based initialization parameter occurring, determining, by the one or more processors, to initialize the obstruction detection device.

19. The method of claim 16, wherein initializing the obstruction detection device is based on pre-determined time intervals.

* * * * *